US012688784B2

(12) United States Patent
Krietzman

(10) Patent No.: US 12,688,784 B2
(45) Date of Patent: Jul. 21, 2026

(54) REAL TIME ALERT FOR LANDING AIRPLANES

(71) Applicant: Mark Krietzman, Palos Verdes Estates, CA (US)

(72) Inventor: Mark Krietzman, Palos Verdes Estates, CA (US)

( * ) Notice: Subject to any disclaimer, the term of this patent is extended or adjusted under 35 U.S.C. 154(b) by 62 days.

(21) Appl. No.: 18/755,506

(22) Filed: Jun. 26, 2024

(65) Prior Publication Data

US 2025/0006065 A1     Jan. 2, 2025

Related U.S. Application Data

(60) Provisional application No. 63/524,383, filed on Jun. 30, 2023.

(51) Int. Cl.
| | |
|---|---|
| *G08G 5/54* | (2025.01) |
| *G01S 7/487* | (2006.01) |
| *G01S 17/08* | (2006.01) |
| *G01S 17/88* | (2006.01) |
| *G08G 5/21* | (2025.01) |
| *G08G 5/74* | (2025.01) |

(52) U.S. Cl.
CPC ................ *G08G 5/54* (2025.01); *G01S 7/487* (2013.01); *G01S 17/08* (2013.01); *G01S 17/88* (2013.01); *G08G 5/21* (2025.01); *G08G 5/74* (2025.01)

(58) Field of Classification Search
None
See application file for complete search history.

(56) References Cited

U.S. PATENT DOCUMENTS

| | | | | |
|---|---|---|---|---|
| 9,527,601 | B2 * | 12/2016 | Wyatt ...................... | G08G 5/21 |
| 2003/0011493 | A1 * | 1/2003 | Wiplinger ............... | B64C 25/28 |
| | | | | 340/960 |
| 2014/0152792 | A1 * | 6/2014 | Krueger ............... | A61B 5/4863 |
| | | | | 348/78 |
| 2014/0236398 | A1 * | 8/2014 | Zhang ................... | B64D 45/08 |
| | | | | 701/4 |
| 2016/0328981 | A1 * | 11/2016 | Herder .................. | B64D 43/00 |
| 2017/0214904 | A1 * | 7/2017 | Wyatt ...................... | G08G 5/21 |
| 2017/0356757 | A1 * | 12/2017 | Bourret .................. | G01C 21/20 |
| 2018/0238708 | A1 * | 8/2018 | He ......................... | B64D 45/08 |
| 2020/0380958 | A1 * | 12/2020 | Srinivasan ............. | G08G 5/76 |
| 2022/0139240 | A1 * | 5/2022 | Marconnet .............. | G08G 5/26 |
| | | | | 701/17 |
| 2022/0214445 | A1 * | 7/2022 | Urbanec .................. | G08G 5/21 |

(Continued)

FOREIGN PATENT DOCUMENTS

| | | | | | |
|---|---|---|---|---|---|
| CA | 3010372 | A1 * | 1/2019 | .......... | G01C 23/005 |
| CH | 660157 | A5 * | 3/1987 | .......... | B64C 27/006 |

(Continued)

*Primary Examiner* — Fekadeselassie Girma
(74) *Attorney, Agent, or Firm* — Mark H. Krietzman

(57) ABSTRACT

A dynamic ground distance training system and method of training for pilots including one or more emitters facing downward direct signal of focused energy (or sound and/or light) towards the runway and said focused energy signal is reflected from the runway; the reflected signal is received by one or more receivers positioned generally downward; and, the energy signal is processed via microprocessor(s) and a distance based on the time intervals when sampling signal reflections is determined.

11 Claims, 5 Drawing Sheets

(56)         References Cited

U.S. PATENT DOCUMENTS

2022/0343778 A1 * 10/2022 Yankanchi ............... G08G 5/80
2025/0006065 A1 *  1/2025 Krietzman ............... G08G 5/21

FOREIGN PATENT DOCUMENTS

CN          109977517 A  *  7/2019  ............. G06F 30/20
WO      WO-2005114613 A1 * 12/2005  ............. G08G 5/54
WO      WO-2017068570 A1 *  4/2017  ............. B64C 13/18

* cited by examiner

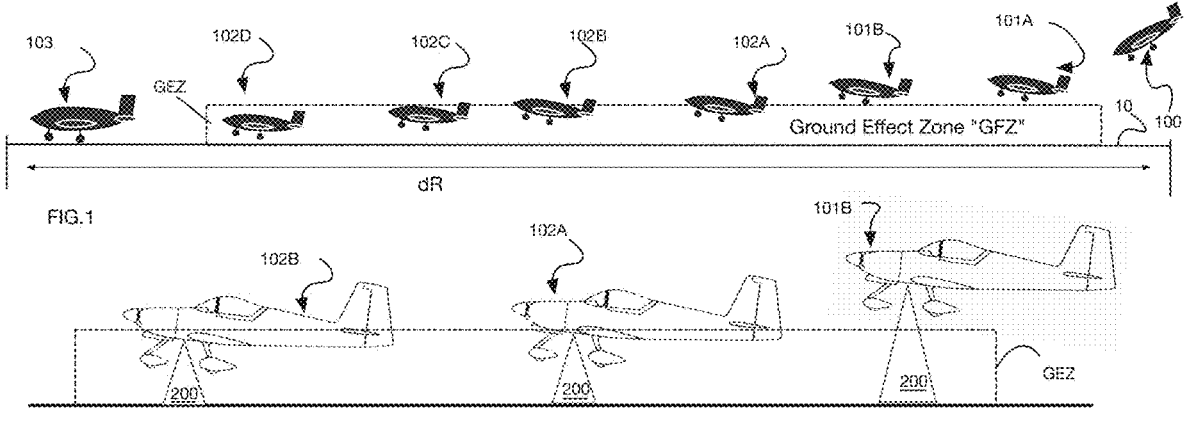
FIG.1
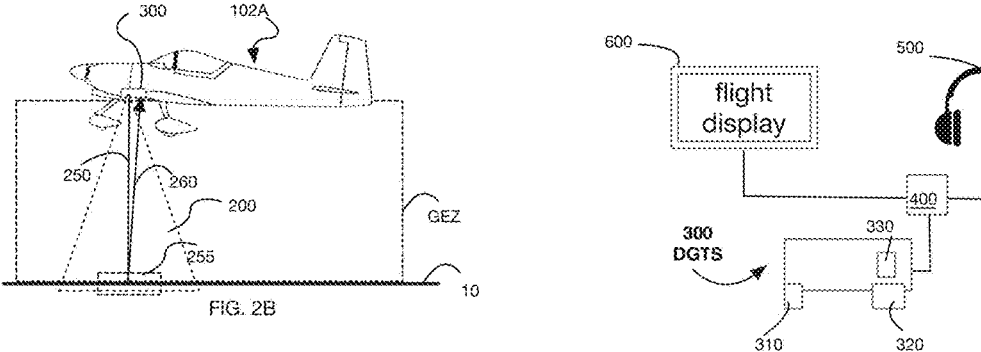
FIG. 2A
FIG. 2B
FIG. 3

REAL TIME ALERT FOR LANDING AIRPLANES

BACKGROUND OF THE DISCLOSURE

Related Application

This application claims the benefit of Applicant's United States ("U.S.") Provisional Patent Application FOR REAL TIME ALERT FOR LANDING AIRPLANES TRACK Ser. No. 63/524,383 filed Jun. 30, 2023, the entirety of which are incorporated by reference herein in as if set forth in their entirety.

FIELD OF THE DISCLOSURE

The present disclosure relates generally to the landing of aircrafts by natural persons.

RELATED ART

Aircraft landings are a critical part of safe aviation. Currently many air fields have lighting systems, approach lights and visual approach slope indicator (VASI) as well as visual lines and markings which provide visual cues a pilot can view to help follow a proper glide slope to the field. Smaller private aircrafts do not have Autoland capabilities, some commercial airlines have available auto land system. Avoiding porpoise or bouncing at landing improves safety and protects property and people.

Pilots describe ground effect when landing like a cushion of air that keeps the airplane floating down the runway. Particularly true for a low wing aircraft the goal of a good flare to landing is to manage the plane's momentum so that it settles onto the runway and to avid a ballooning. Generally, the distance from the ground of the wing impacts the wingtip vortices and reduces downwash and drag Accordingly, generally low wig aircrafts are impacted to a greater extent. Improper landings can result in bouncing and oscillations leading to propeller strikes and injury to persons and property.

It is therefore a desideratum to have a device, method and or system wherein the pilot learns to land and to use ground effect.

DESCRIPTION

For the new pilot and even the experienced pilot landing can be one of the most challenging activities. In particular new pilots need to learn how a specific aircraft responds to the "ground effect" and/or how a pilot responds to bounces and oscillations which can result in damage to the plane and injury or loss of life. A training system and method using feedback during landing will help the new (and experienced) pilot better master the ground effect.

Method, system and device is disclosed including a dynamic ground distance training system for pilots having one or more emitters facing downward direct signal of focused energy (or sound and/or light) towards the runway and said focused energy signal is reflected from the runway then is received by one or more receivers positioned generally downward. The energy signal is processed by a computing device via microprocessor(s) and at least one of vertical and horizontal distances based on the time intervals when sampling signal reflections is determined. In some instances an interface module in signal communication with the computing device configured to provide at least audible feedback through headsets. In some instances when the aircraft is in the ground effect zone (GEZ) the audible feedback changes as the aircraft gets closer or further from the height of the runway surface underneath the aircraft. In some instances the audible feedback issues an alert including but not limited to a "go around" command if the aircraft exceeds a threshold. In some instances the audible feedback issues an alert including but not limited to an audible "go around" command if the aircraft is entering an oscillation when in positioned in the GEZ during attempted landing.

Method, system and device is disclosed including a dynamic ground distance training system for pilots having one or more emitters facing downward direct signal of focused energy (or sound and/or light) towards the runway and said focused energy signal is reflected from the runway then is received by one or more receivers positioned generally downward. The energy signal is processed by a computing device via microprocessor(s) and at least one of vertical and horizontal distances based on the time intervals when sampling signal reflections is determined. In some instances an interface module in signal communication with the computing device configured to provide at least audible feedback through headsets. The computing at least uses sampled measurements of the aircraft vertical or horizontal distance measurements between a first bounce on the runway and a second bounce on to decide to issue the alert. In some instances the computing at least uses sampled measurements of the aircraft's horizontal distance between the first bounce on the runway and the second bounce to decide to issue the alert. In some instances the computing at least uses sampled measurements of the aircraft's speed between the first bounce on the runway and the second bounce to decide to issue the alert.

Method, system and device is disclosed including a dynamic landing training system for pilots having one or more emitters facing downward direct signal of focused energy (or sound and/or light) towards the runway and said focused energy signal is reflected from the runway and received by one or more receivers positioned generally downward. The energy signal is processed by a computing device via microprocessor(s) and at least one of distances and speed based on the time intervals between the sampled signal reflections is determined and an interface module in signal communication with the computing device configured to provide at least audio feedback. When the aircraft is in the ground effect zone (GEZ) the audio feedback or cues change as the aircraft gets closer or further from the height of the runway surface underneath the aircraft. In some instances the computing at least uses sampled measurements of the aircraft vertical or horizontal distance measurements after a first bounce on the runway and alerts the pilot to take corrective action. In some instances the alert is one of "go around" and "add power".

Method, system and device is disclosed including a dynamic ground landing training for pilots having including affixing to an aircraft one or more emitters facing downward direct signal of focused energy (or sound and/or light) towards the runway and said focused energy signal is reflected from the runway and received by one or more receivers. The reflected energy signal is processed by a computing device via microprocessor(s) and at least one of distances and speed based on the time intervals between the sampled signal reflections is determined and wherein when the aircraft is in a ground effect zone (GEZ) audio feedback indicates changes as the aircraft gets closer or further from the height of the runway surface underneath the aircraft. In some instances an interface module in signal communication with the computing device configured to provide the audio cues or feedback. In some instances when the aircraft is in the ground effect zone (GEZ) the audio feedback or cues change in a first fashion as the aircraft gets closer to the runway surface and said audio feedback or cues change in a second fashion as the aircraft gets further from the runway surface. In some instances the aircraft is in the ground effect zone (GEZ) and the vertical or horizontal position of the aircraft relative to the runway exceeds a threshold then the audio feedback or cue is at least an alert including but not limited to a "go around". In some instances when the aircraft is in the ground effect zone (GEZ) and if the aircraft is in an oscillation relative to the runway and the oscillation exceeds a threshold then the audio feedback is at least an alert including but not limited to a "go around".

FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIG. 1 illustrates an aircraft landing and utilizing the ground effect.

FIGS. 2A and 2B illustrate an exemplary implementation of the real time landing alert disclosed herein;

FIG. 3 illustrates aspects of the real time landing system.

Figure 4:
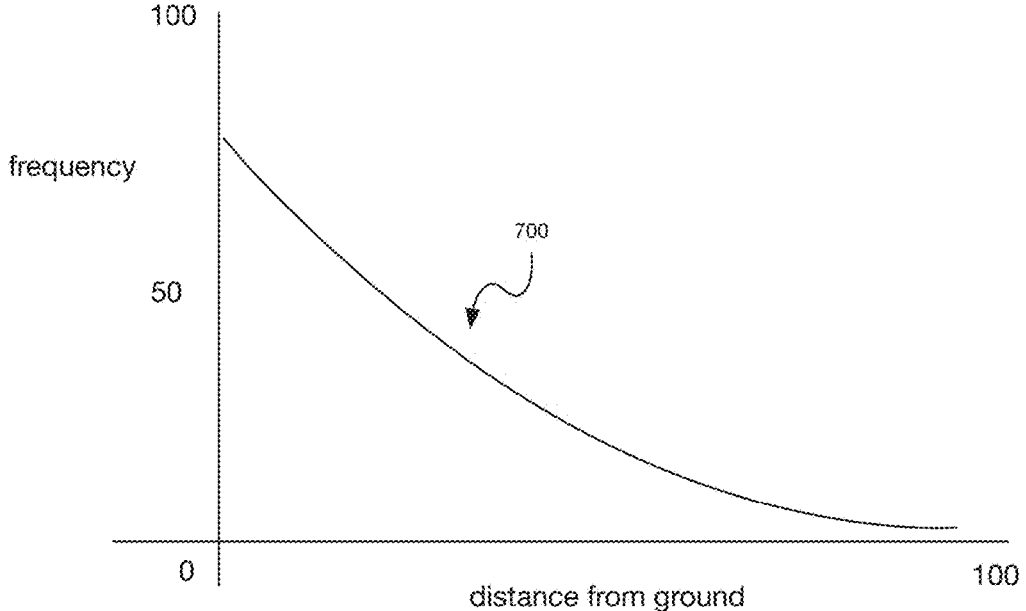
FIG. 4 is a graphical representation of a method of real time landing alert.

All descriptions and callouts in the Figures and all content therein are hereby incorporated by this reference as if fully set forth herein.

FURTHER DESCRIPTION

Training the new pilot and even the experienced pilot for better landing can reduce stress, anxiety, risk and injury to person and property. Disclosed is a system, device and methods to provide teaching feedback in real time for specific aircrafts to land better and know when to correct or go around. a specific aircraft responds to the "ground effect" and/or how a pilot responds to bounces and oscillations which can result in damage to the plane and injury or loss of life.

It is appreciated by those skilled in the art that some of the optical and circuits, components, controllers, modules, and/or devices of the system disclosed in the present application are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical such as, for example, conductive wires, electromagnetic wave guides, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying analog and/or digital formats without passing through a direct electromagnetic connection. These information paths may also include analog-to-digital conversions ("ADC"), digital-to-analog ("DAC") conversions, data transformations such as, for example, fast Fourier transforms ("FFTs*"), time-to-frequency conversations, frequency-to-time conversions, database mapping, signal processing steps, coding, modulations, demodulations, etc. The controller devices and smart devices disclosed herein operate with memory and processors whereby code is executed during processes to transform data, the computing devices run on a processor (such as, for example, controller or other processor that is not shown) which may include a central processing unit ("CPU"), digital signal processor ("DSP"), application specific integrated circuit ("ASIC"), field programmable gate array ("FPGA"), microprocessor, etc. Alternatively, portions DCA devices may also be or include hardware devices such as logic circuitry, a CPU, a DSP, ASIC, FPGA, etc. and may include hardware and software capable of receiving and sending information. A laser measure generates a beam of light, which is aimed at a target and the return reflection is received the time between emission and receipt is used to calculate distance.

Digital circuitry measures the time it takes for the laser beam to reach and bounce off the target and return to the unit and thus calculates the distance. Lidar is synonymous with light detection and ranging and uses light spanning the ultraviolet spectrum through visible and near infrared (from about 10 micrometers to about 250 nanometers) depending on the particular system design a processor controls a signal generator and a light pulse is emitted from emitters and then the reflection of that light and the time interval to be received by a receiver is utilized to calculated distance. Another range finding system is ultrasonic. By utilizing sound and sound reflection a transmitting (emitting) transducer and a receiving transducer measure a sound "ping" or pulse of kHz spectrum's travel time from emission to reflection back to the system. Emitter is used herein to describe a pulse of sound or light produced and transmitted. Receiver is used herein to describe the pulse of sound or light reflected off a surface and received. Machine vision includes range finding or distance measured. By emitters and receivers.

FIG. 1 illustrates and overview of a sequence showing an aircraft landing. A runway 10 of length dR has a ground effect zone "GEZ" which is dependent on the aircraft configuration. A low wing aircraft can land with its wings a few feet above the runway when landed is impacted by reductions in drag and downwash to a greater extent than a high wing aircraft which has wings that may be 6-8 feet above the runway when landed. Ground effect is part of aviation and teaching a new pilot to use the ground effect to and softly and avoid ballooning or bouncing which can result in oscillations and propeller strikes is necessary to avoid injury to persons and property.

Traditionally the new pilot learns how to experience and, hopefully use, ground effect wisely through trial and error. It may take hundreds of landings to develop some understanding of ground effect. Disclosed herein are aspects of methods systems and devices to reduce that learning curve via dynamic feedback. The system is adaptable to various aircrafts and runways of various lengths. Length matters for a runway, as an aircraft which is floating will need a longer runway than an aircraft with less float. The term used in aviation is the "flare" during which a pilot learns to control the plane by adjusting its attitude and/or angle of attack while in the ground effect zone (GEZ) as speed is reduced to settle the aircraft down smoothly without or with minimal bounce. Aircraft 100 approaches the runway and then aircraft 100A-100B begins to change attitude to land but is outside (above) the GEZ. As the aircraft 102A-102D loses speed and floats in ground effect it nears the ground and eventually aircraft 103 is in contact with the runway 10.

FIGS. 2A and 2B are zoomed in view of portions of the landing sequence in ground effect illustrated in FIG. 1 and illustrates the overview of the system to train landing and use of ground effect. Aircraft 101B is above the GEZ and aircraft 102A and 102B are in the GEZ. A dynamically changing training systems produces, collects and uses optical and/or sound distance measurements 200 via a dynamic ground distance system 300 to provide real time feedback to train landing skills.

FIG. 3 is a component view of aspects of a dynamic ground distance training (DGDTS) system 300. In the DGDTS one or more emitters 310 which may be ultrasonic, laser or LiDAR generally facing downward direct signal of focused energy (or sound and/or light) 250 towards the runway 10 which is then reflected 255 and a reflected signal 260 is received by the measurement system having one or more receivers 320 positioned generally downward. A signal based on measurement of the timing of emitted energy and the receipt of the emitted energy reflected off the runway surface is processed by a computing device 300 having microprocessor(s) 330 in signal communication with the emitters and receivers. A distance based on the time intervals when sampling signal reflections is determined. From the forward movement of the aircraft between sampled signal aircraft speed can be approximated and/or calculated for use in the alert system disclosed herein. In some instances the focused energy is produced by one or more emitters controlled by at least one of a controller and microprocessor. Those of ordinary skill in the art will recognize that the microprocessors or controllers described herein can associated with and in signal communication with one or more computing devices either affixed to the aircraft or in a portable device such as a "smart phone", tablet or other portable computing device in signal communication with at least one of the receivers and the emitters. An interface module 400 in signal communication with a computing device provides one or more of audio feed back 500 through headsets and the like and may provide visual feedback to a flight display 600 such as a those manufactured by Gramin®, or via a simple flashing light in the cockpit or on or about a dashboard.

FIG. 4 is a graph 700 showing frequency versus distance to ground on the axes. Aspect of this system and method to utilize ground effect efficiently includes a frequency 700 is provided to the pilot via visual and/or audio cues. The closer the aircraft comes to the higher the frequency. The frequency may be a tone or light intensity or preferable a series of audible pings which are more frequent as approach to the GEZ is occurring and the aircraft is travelling in the GEZ until landing. In general when the aircraft is in the GEZ and the distance from the runway surface becomes closer over time the audible cues changes in a first fashion and of the aircraft moves further from the runway surface the audible cues changes in a second fashion.

Figure 5:
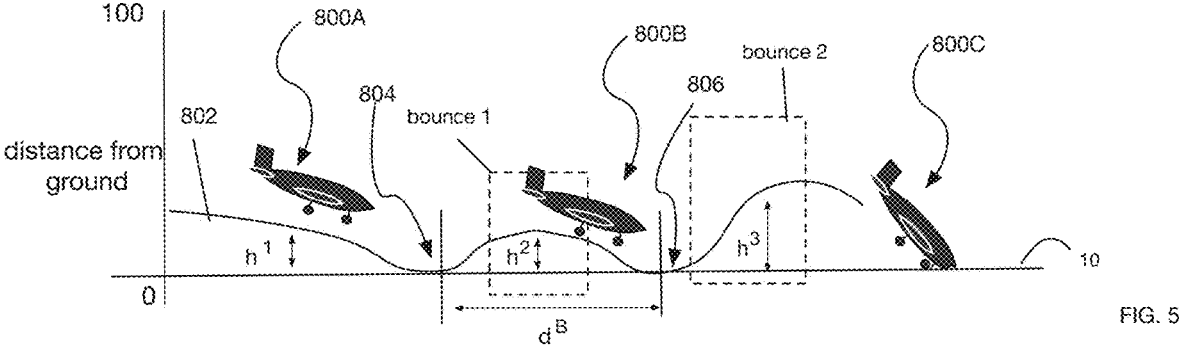
FIG. 5 illustrates an oscillated bouncing landing/propeller strike.

FIG. 5 shows a sequential view of aircraft 800 (A-C) landing in a dangerous fashion.

Line 802 shows a view of the path of said aircraft. A height just prior to touchdown $h^1$ of the aircraft 800A is shown. In this exemplar the sequential movement of the aircraft 800B shows it is in an improper position for a landing and the first contact point 804 leads to a first bounce "bounce 1" to a height after bounce ("bounce 1") $h^2$. Without proper corrective measures the bounce ("bounce 1") leads to a second contact point 806 with the ground causing the aircraft to enter into a second bounce ("bounce 2") also known as an oscillation. The distance between bounces $d^B$ is also be measured and recorded and processed in the system. The second bounce having a height $h^3$ which, without corrective action causes the next sequenced aircraft 800C to head nose down. Into the runway causing a propeller strike and resulting damage an/or injury.

Figure 6:
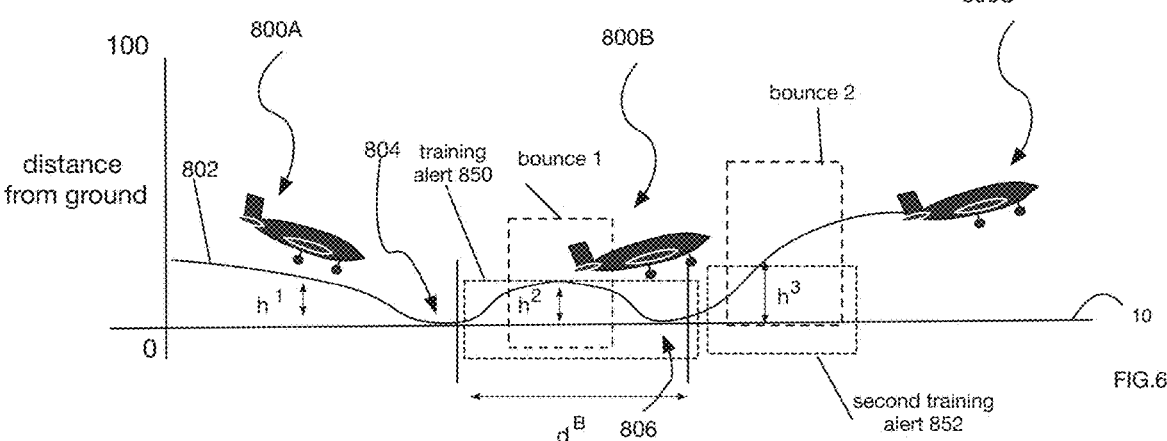
FIG. 6 illustrates a go around after landing bounce alert.

FIG. 6 shows a sequential view of aircraft 800 (A-C) approaching a landing in a dangerous fashion. Line 802 shows a view of the path of said aircraft. A height just prior to touchdown $h^1$ of the aircraft 800A is shown. In this exemplar the sequential movement of the aircraft 800B shows it is in an improper position for a landing and the first contact point 804 leads to a first bounce "bounce 1" to a height after bounce ("bounce 1") $h^2$. Without proper corrective measures the bounce ("bounce 1") leads to a second contact point 806 with the ground causing the aircraft to enter into a second bounce ("bounce 2") also known as an oscillation. In this instance the training alert 850 provides the audio or visual warning to the pilot which may include but are not limited to "go around", "add power", "level off". In some instances the training alert 850 may be the interval between audible sounds corresponding to the aircrafts height from the runway to help the pilot level off to land which in some instance may require addition of power to the engine. The aircraft shown 800B is illustrated entering a go round profile. However, if the pilot ignores the warning and a second bounce when the aircraft having a height $h^3$ occurs a second training alert 852 is provided and the aircraft 800C is shown reentering the traffic pattern rather than attempting a dangerous landing profile.

Figure 7:
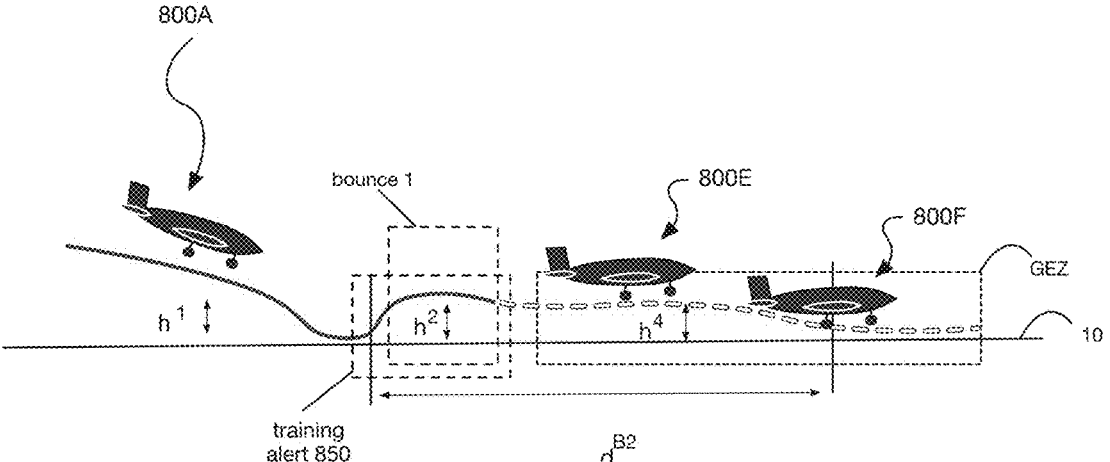
FIG. 7 illustrates a corrected landing after bounce alert.

FIG. 7 shows a sequential view of aircraft 802 (A, E and F) with a pilot responding to a first lading alert 850 after a first bounce by leveling off (adding power) whereby aircraft 800E transitions to a corrected height $h^4$, as the pilot using feedback from the system adjusts at least one of pitch, angle of attack and throttle utilizing the GEZ and the aircraft 800F comes to a safe landing without a second bounce. When in the GEZ the training system and audible or visual changing frequency helps the pilot bleed off air and gently land. During landing training for visual flight rules (VFR) pilots audio or audible alerts and command are preferred. During landing training for pilots in aircrafts without glass cockpits audible alerts and command are preferred. Even in an older aircraft lacking a glass cockpit which is fitted with the disclosed training system, a portable computing device such as an tablet or smart phone may be used to issue the alert through headsets having mixed radio and a second input.

Figure 8:
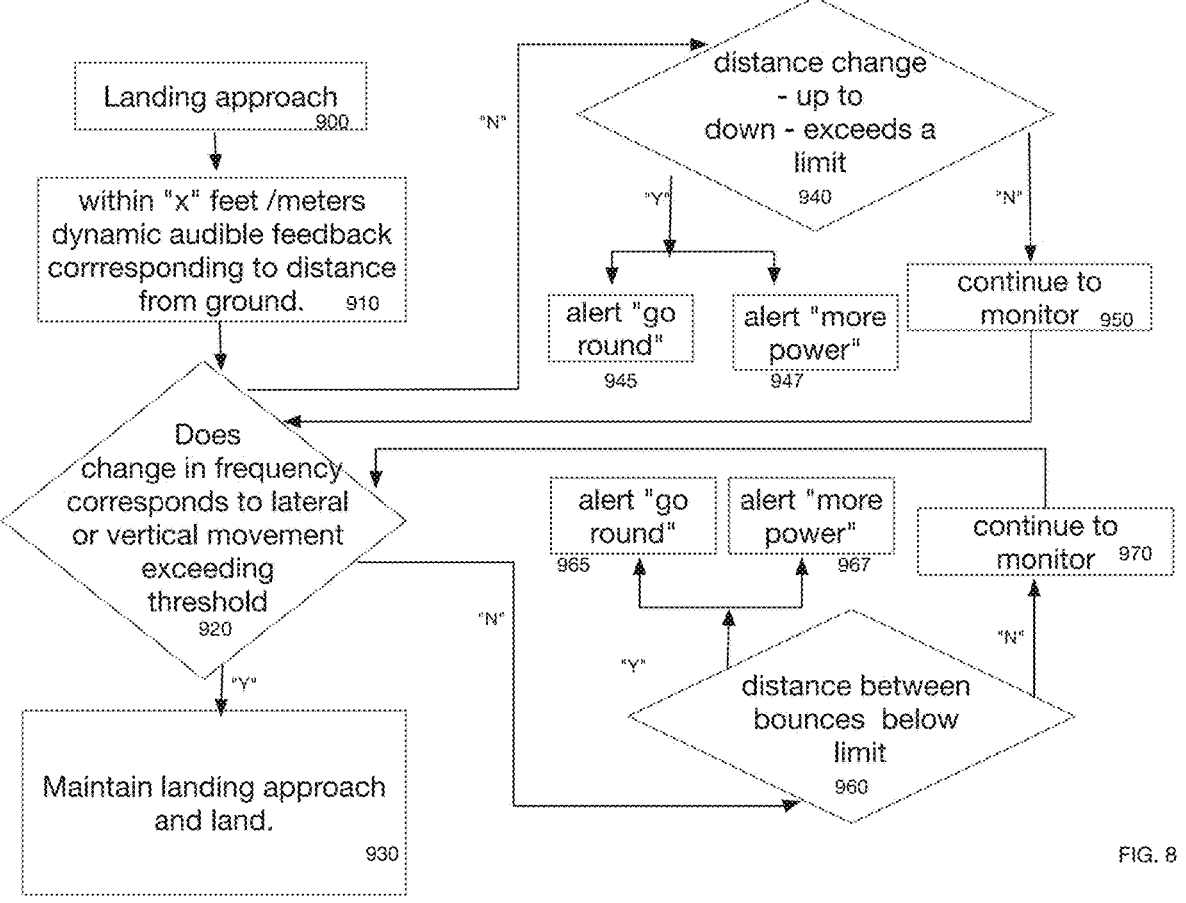
FIG. 8 illustrates aspects of the method of the real time landing training system.

FIG. 8 is a flow diagram illustrating aspects of the system and method to utilize ground effect efficiently and the landing alert system and method disclosed herein. During the landing approach. 900, the system and method to utilize ground effect efficiently begins providing audible and/or visual alerts for the pilot within a predetermined distance from the ground 910. That predetermined distance may be aircraft specific based on the length of the wings, configuration as high wing or low wing aircraft and the stall speeds involved. The processor determines if a lateral (x and y axis)) or vertical (z-axis) movement of the plane exceeds a threshold 920. The threshold may be fixed or adjustable. In some instances the training entity or instructor may set thresholds. In some instances the pilot may set the thresholds. If a threshold is exceeded the system continues to measure the aircraft's distance from the runway and the movement (horizontal distance) and slope of the glide path and/or angle of attack. If the vertical changes in distance over time exceed a limit 940 an alert such as, but not limited to, "go round" alert 945 or a "more power" alert 947 will be communicated to the pilot. If a the limit is not reached the system will continue to monitor 950.

If the distance between bounce on the runway is below a limit 960 an alert such as, but not limited to, "go round" 965 or "add power" 967 is communicated to the pilot. If the distance between bounces is not below a limit the system will monitor 970.

Both the vertical and horizontal measurements are monitored in real time. A large change in vertical height with a sufficiently large change in horizontal distance may fall below a threshold or limit, while the same change in height with a smaller change in horizontal distance could exceed a threshold or limit triggering an alert or alarm.

It will be understood that various aspects or details of the disclosures may be changed combined, or removed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

What is claimed is:

1. A dynamic ground distance training system for pilots comprising:
   one or more emitters facing downward direct signal of focused energy (or sound and/or light) towards the runway;
   said focused energy signal is reflected from the runway;
   the reflected signal is received by one or more receivers positioned generally downward; and,
   the energy signal is processed by a computing device via microprocessor(s) and at least one of vertical and horizontal distances based on the time intervals when sampling signal reflections is determined;
   an interface module in signal communication with the computing device configured to provide at least audible feedback through at least one headset; and,
   wherein the audio feedback issues an alert including but not limited to an audible "go around" command if the aircraft is entering an oscillation when in positioned in the GEZ during attempted landing.

2. The dynamic ground distance training system for pilots of claim 1, wherein when the aircraft, is in the ground effect zone (GEZ) the audible feedback changes as the aircraft gets closer or further from the height of the runway surface underneath the aircraft.

3. The dynamic ground distance training system for pilots of claim 1, further comprising the audible feedback issues an alert including but not limited to a "go around" command if the aircraft exceeds a threshold.

4. The dynamic ground distance training system for pilots of claim 1, further comprising the computing at least uses sampled measurements of the aircraft vertical or horizontal distance measurements between a first bounce on the runway and a second bounce on to decide to issue the alert.

5. The dynamic ground distance training system for pilots of claim 1, wherein the computing at least uses sampled measurements of the aircraft's horizontal distance between the first bounce on the runway and the second bounce to decide to issue the alert.

6. The dynamic ground distance training system for pilots of claim 1, wherein the computing at least uses sampled measurements of the aircraft's speed between the first bounce on the runway and the second bounce to decide to issue the alert.

7. A dynamic landing training system for pilots comprising:
   one or more emitters facing downward direct signal of focused energy (or sound and/or light) towards the runway;
   said focused energy signal is reflected from the runway;
   the reflected signal is received by one or more receivers positioned generally downward;
   the energy signal is processed by a computing device via microprocessor(s) and at least one of distances and speed based on the time intervals between the sampled signal reflections is determined;
   an interface module in signal communication with the computing device configured to provide at least audio feedback;
   wherein when the aircraft is in the ground effect zone (GEZ) the audio feedback changes as the aircraft gets closer or further from the height of the runway surface underneath the aircraft; and,
   the computing at least uses sampled measurements of the aircraft vertical or horizontal distance measurements after a first bounce on the runway and alerts the pilot to take corrective action.

8. The dynamic landing training system for pilots of claim 7, wherein the alert is one of "go around" and "add power".

9. A dynamic method of aircraft landing training, the method comprising:
   affix to an aircraft one or more emitters facing downward direct signal of focused energy (or sound and/or light) towards the runway;
   affix to the aircraft one or more receivers facing downward towards the runway;
   wherein and said focused energy signal is reflected from the runway and received by the one or more receivers;
   the reflected energy signal is processed by a computing device via microprocessor(s) and at least one of distances and speed based on the time intervals between the sampled signal reflections is determined;
   providing an interface module in signal communication with the computing device configured to produce the audio feedback;
   wherein when the aircraft is in a ground effect zone (GEZ) audio feedback indicates changes as the aircraft gets closer or further from the height of the runway surface underneath the aircraft; and,
   wherein when the aircraft is in the ground effect zone (GEZ) and if the aircraft is in an oscillation relative to the runway and the oscillation exceeds a threshold then the audio feedback is at least an alert including but not limited to a "go around".

10. The dynamic method of aircraft landing of claim 9, wherein when the aircraft is in the ground effect zone (GEZ) the audio feedback changes in a first fashion as the aircraft gets closer to the runway surface and changes in a second fashion as the aircraft gets further from the runway surface.

11. The dynamic method of aircraft landing of claim 9, wherein when the aircraft is in the ground effect zone (GEZ) and the vertical or horizontal position of the aircraft relative to the runway exceeds a threshold then the audio feedback is at least an alert including but not limited to a "go around".

\* \* \* \* \*